US008385210B1

(12) United States Patent
Weill et al.

(10) Patent No.: US 8,385,210 B1
(45) Date of Patent: Feb. 26, 2013

(54) SYSTEM AND METHOD FOR DETECTION AND DELAY CONTROL IN A NETWORK ENVIRONMENT

(75) Inventors: Ofer Weill, Modi'in (IL); Ori Finkelman, Tel-Aviv (IL); Oren Malerevich, Kiryat Uno (IL); Kobi Vaknin, Yavne (IL); Yaniv Azran, Arad (IL)

(73) Assignee: Cisco Technology, Inc., San Jose ( * ) Notice: Subject to any disclaimer, the term of this patent is extended or adjusted under 35 U.S.C. 154(b) by 332 days.

(21) Appl. No.: 12/338,892

(22) Filed: Dec. 18, 2008

(51) Int. Cl.
*H04L 12/56* (2006.01)

(52) U.S. Cl. ......... 370/238; 370/252; 370/235; 370/233

(58) Field of Classification Search .................. 370/233, 370/238, 252
See application file for complete search history.

(56) References Cited

U.S. PATENT DOCUMENTS

| | | | |
|---|---|---|---|
| 5,926,226 A | 7/1999 | Proctor et al. | |
| 6,072,830 A | 6/2000 | Proctor et al. | |
| 6,279,050 B1 | 8/2001 | Chilton et al. | |
| 6,301,253 B1 * | 10/2001 | Ichikawa | 370/395.71 |
| 6,418,488 B1 | 7/2002 | Chilton et al. | |
| 6,539,026 B1 * | 3/2003 | Waclawsky | 370/428 |
| 6,662,203 B1 * | 12/2003 | Kling et al. | 718/103 |
| 6,717,917 B1 * | 4/2004 | Weissberger et al. | 370/252 |
| 6,721,273 B1 * | 4/2004 | Lyon | 370/235 |
| 6,831,893 B1 | 12/2004 | Nun et al. | |
| 6,954,800 B2 | 10/2005 | Mallory | |
| 7,155,533 B2 * | 12/2006 | Klotsche | 709/235 |
| 7,376,141 B2 * | 5/2008 | Rosengard et al. | 370/412 |
| 7,401,333 B2 | 7/2008 | Vandeweerd | |
| 7,414,972 B2 | 8/2008 | Grah et al. | |
| 7,463,631 B2 | 12/2008 | Bao et al. | |
| 7,668,103 B1 * | 2/2010 | Pannell et al. | 370/237 |
| 2003/0012136 A1 * | 1/2003 | Walles | 370/229 |
| 2003/0039213 A1 * | 2/2003 | Holtzman et al. | 370/252 |
| 2004/0042411 A1 * | 3/2004 | Dahlback et al. | 370/252 |
| 2004/0057379 A1 * | 3/2004 | Chen et al. | 370/235 |
| 2006/0087964 A1 * | 4/2006 | Valk | 370/218 |
| 2006/0092845 A1 * | 5/2006 | Kwan et al. | 370/235 |
| 2006/0268713 A1 * | 11/2006 | Lundstrom | 370/235 |
| 2007/0002848 A1 * | 1/2007 | Kudou et al. | 370/378 |
| 2007/0297415 A1 * | 12/2007 | Lee et al. | 370/395.4 |
| 2007/0297435 A1 * | 12/2007 | Bucknell et al. | 370/412 |
| 2008/0279189 A1 * | 11/2008 | Smith et al. | 370/394 |

\* cited by examiner

*Primary Examiner* — Ricky Ngo
*Assistant Examiner* — Rasheed Gidado
(74) *Attorney, Agent, or Firm* — Patent Capital Group

(57) ABSTRACT

A method is provided in one example embodiment and includes indentifying a delay within one or more queues in a service element by evaluating a type of packet sought for processing in the service element. The method also includes comparing the delay to a threshold value to determine whether to adjust a processing mode of the service element. In more specific embodiments, the method includes providing a flow table that maps specific packets of a flow traversing the service element for receiving a certain amount of processing from a processor engine. The adjustment can include avoiding opening new flows for the service element, or providing continued service to a selected few flows and not others, or avoiding processing for certain types of services having less priority.

20 Claims, 2 Drawing Sheets

SYSTEM AND METHOD FOR DETECTION AND DELAY CONTROL IN A NETWORK ENVIRONMENT

TECHNICAL FIELD OF THE INVENTION

This invention relates in general to the field of communications and, more particularly, to a system and a method for early detection and control of delay in a network environment.

BACKGROUND OF THE INVENTION

Networking architectures have grown increasingly complex in communication environments. This complexity has resulted in numerous protocols being implemented to ensure that service elements are functioning optimally and directing packets in an efficient manner. Service elements typically provide service for traffic in a given network. For example, these services could include deep packet inspection (DPI), firewall activities, quality of service (QoS) operations, and session border controller (SBC) functions.

Due to the nature of many of these services, the processing time [per packet] of these elements is not fixed. For example, there is a significant variant for DPI and that variance could be in the order of ten. As a result, bursts of packets can engender large processing times, which spawn a huge delay inside the service elements. As in the case in virtually all networks, such a delay is problematic, as it can affect real-time services and generally inhibit performance for a multitude of users of the network.

Thus, the ability to offer a system or a protocol that offers an effective processing for packets (while accommodating inherent delay in the system) provides a significant challenge to network designers, component manufacturers, service providers, and system administrators alike.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes indentifying a delay within one or more queues in a service element by evaluating a type of packet sought for processing in the service element. The method also includes comparing the delay to a threshold value to determine whether to adjust a processing mode of the service element. In more specific embodiments, the method includes providing a flow table that maps specific packets of a flow traversing the service element for receiving a certain amount of processing from a processor engine. The adjustment can include avoiding opening new flows for the service element, or providing continued service to a selected few flows and not others, or avoiding processing for certain types of services having less priority.

In still other embodiments, the delay is identified by dividing one or more packets traversing the service element into multiple groups. Each of the groups can be characterized by an average processing time for packets within the groups. In yet other embodiments, each of the groups is assigned a weight that represents an average processing time of the group in relation to a processing time of other groups. When a selected first packet enters the queue, its weight is added to an accumulated delay of the queue and when a selected second packet exits the queue its weight is subtracted.

Figure 1:
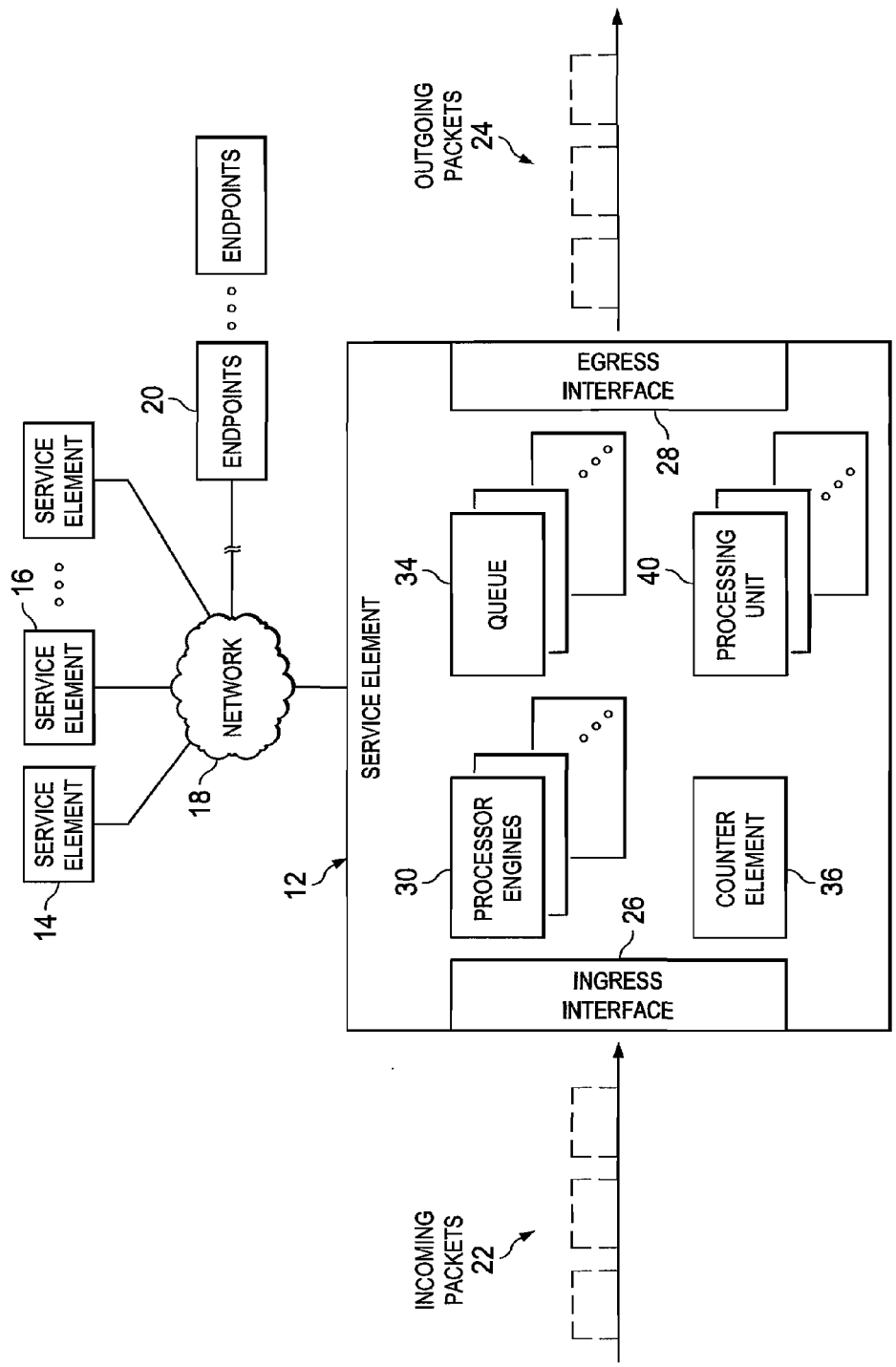
FIG. 1 is a simplified block diagram of a communication system for detecting and controlling delay in a network environment in accordance with one embodiment of the present invention.

Turning to FIG. 1, FIG. 1 is a simplified block diagram of a communication system 10 for detecting and controlling delay in a network environment. Communication system 10 provides a mechanism to predict processing delay and allow a service element to react and limit this delay. FIG. 1 includes a plurality of service elements 12, 14, and 16, which may be coupled to a network 18. Network 18 can be used for the transport of packets using any suitable transport protocol. One or more endpoints 20 are also provided in FIG. 1 and these elements represent end users or computers that seek to access some service or some feature via network 18.

FIG. 1 may be generally configured or arranged to represent any communication architecture capable of exchanging packets in a network environment. Such configurations may include, for example, first generation, 2G, 2.5G, and 3G architectures that offer packet-exchanging capabilities. In addition, communication system 10 may include any suitable networking protocol or arrangement that provides a communicative platform for communication system 10. Thus, communication system 10 may include a configuration capable of transmission control protocol/internet protocol (TCP/IP) communications for the transmission or reception of packets in a network. Communication system 10 may also operate in conjunction with a user datagram protocol/IP (UDP/IP) or any other suitable protocol where appropriate and based on particular needs.

For purposes of explaining some of the capabilities of the service elements, one service element has been expanded in FIG. 1 to highlight some of its potential internal functionalities. Service element 12 can process incoming packets 22 such that they exit service element 12 as processed, outgoing packets 24. Service element 12 may include an ingress interface 26 and an egress interface 28 to facilitate these operations. Each of these interfaces may include an appropriate port for accommodating service flows that propagate through service element 12. Service element 12 may also include one or more processor engines 30 that may be coupled to one or more queues, which temporarily store one or more packets to be further processed. In one example non-limiting embodiment, queues 34 are first in, first out (FIFO) storage elements. Queues 34 are coupled to the additional processing units 40, which execute some final processing before the packets leave service element 12. In addition, service element 12 includes a counter element 36 that keeps track of packets entering and exiting queue 34 (e.g., incrementing and decrementing packet weights as packets traverse service element 12).

Thus, service element is built from one or more processing units, which can process the traffic and execute a given service. As the performance requirements from the service elements have increased, hardware-based engines have been provided to assist in processing the traffic before the processing units execute their processing.

These engines increase the overall performance of the service elements by performing some of the tasks relegated to the service elements. As depicted in FIG. 1, there are queues between the engines and the processing units and the packets are stored in queue before arriving at the processing units, which serve them sequentially (one by one).

Normally, the processing of incoming traffic is performed by a set of processors. The processing time for each packet is not constant. The processing time depends on the exact application and which processor will be tasked with processing a particular incoming packet. The system can be sensitive to the types of traffic it receives, as well as the rate of flow. When more and more packets are added to the queues (which feed into the processors), a significant delay is being accumulated in the system. For example, consider a case where a burst of packets is received by a service element, the accumulated delay in the queues will grow. Each individual packet is only adding a small delay to the system; however, when added together, a significant delay is accumulated. In order to increase the efficiency of the system and to achieve a maximum throughput for the processors, the input queues need to be optimally coordinated. If this timing is not coordinated properly, processors are waiting for traffic and not operating efficiently.

In accordance with the techniques and teachings of the present invention, communication system 10 provides a communication approach that can monitor the packets residing in queue 34 and make intelligent decisions based on the accumulated delay. More specifically, a technique is provided that predicts the accumulated delay in the queues. Example embodiments of the present invention can address this delay issue in a number of ways. First, service element 12 can identify the delay inside the queues. For example, if the delay inside the queues is 100 μs, we would inferentially know that the delay would not exceed this number. Second, processor engines 30 can be leveraged in order to optimize delay parameters, as detailed herein. More specifically, processor engines 30 can have an associated flow table such that for each flow, specific packets are identified for receiving a certain amount of processing from processor engines 30.

When the predicted accumulated delay crosses a predefined threshold (which is configurable), the mechanism signals the processing-units that can quickly adjust the processing to the new condition. Examples for potential adjustments include: avoiding opening new flows, providing continued service to a selected few (e.g., more important) flows or subscribers, avoiding certain types of services (e.g., less priority services such as reporting), and other suitable responses that attenuate this delay issue.

The prediction of the delay can be accomplished by division of the packets to multiple groups. Each group can be characterized by the average processing time for these packets by the processing units. This can include accounting for the type of packet that has arrived at the service element such that the particular characteristic of the packet is being accommodated.

When packet goes into the queue, its weight is added to the accumulated delay of the queue. When packet goes out from the queue, its weight is subtracted. The counting can be performed by counter element 36. When the accumulated weight breaches a predefined level, it signals the processing unit about the breaching. The predefined level could be referred to as a maximum latency in the service element. The processing units can calculate the average processing time of each group. The units periodically update the weights of the groups so the prediction can better reflect the accumulated delay.

Before turning to some of the operations of this architecture, a brief discussion is provided about some of the infrastructure of FIG. 1. Service elements 12, 14, and 16 are network elements with appropriate hardware to execute the described operations in an example embodiment of the present invention. As used herein in this Specification, the term 'service element' is meant to encompass firewalls, routers, switches, gateways, bridges, loadbalancers, DPI device, or any other suitable device, component, element, or object operable to exchange information in a network environment. Moreover, these service elements may include any suitable hardware, software, components, modules, interfaces, or objects that facilitate the operations thereof. This may be inclusive of appropriate algorithms and communication protocols that allow for the effective exchange of data or information.

In one example embodiment, processor engines 30 are field programmable gate arrays (FPGAs) that assist communication system 10 in the detection and control of delay for packets in the network. Alternatively, processor engines 30 could be a network processing unit (NPU), a general gate array, an application-specific integrated circuit (ASIC), an application-specific instruction-set processor (ASIP), a complex programmable logic device (CPLD), a field-programmable analog array (FPAA), a very high speed Integrated circuit) hardware description language (VHSIC: VHDL), a static random access memory (SRAM), an erasable programmable read-only memory (EPROM), an electrically erasable programmable read-only memory (EEPROM), a flash-erase EPROM, or any other suitable hardware or software that can execute any of the operations of processor engines 30, as outlined herein.

As used herein in this document, the term 'table' is inclusive of any suitable memory element or storage medium (provided in any appropriate format) that is capable of maintaining information pertinent to the routing and/or processing operations of service elements 12, 14, and 16. For example, the tables may store such information in an electronic register, diagram, record, index, list, or queue. Alternatively, the tables may keep such information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

In one example implementation, the identification and coordination of delay is performed by hardware within service elements 12, 14, and 16 to achieve the optimal processing operations, as outlined herein in this document. In other embodiments, this feature may be provided external to the service elements or included in some other network device to achieve this intended functionality. In still other embodiments, these service elements may include any suitable algorithms, software, components, modules, interfaces, or objects that facilitate the operations thereof. This may be inclusive of appropriate communication protocols that allow for the effective processing of packets, data, or information for achieving an optimal coordination and processing of delays in a network environment.

Turning now to an operational flow that can highlight some of the features of the present invention, in this example flow, a firewall is being discussed as benefiting from the operational features of certain embodiments of the present invention. Initially, a flow of incoming packets arrives at the firewall. Note that for firewall applications, it is common that the first few packets of the flow are more intensive (in terms of processing) than later packets in the flow. In this example, it is determined that the initial packets merit 50 μs of processing, whereas later packets only merit 10 μs of processing.

Note that one problem in predicting the delay in this environment is that there is a weak correlation between a given number of bytes in the queue and the delay. Short packets can require a long processing time, whereas long packets can require a shorter processing time. Other techniques fail to account for this discrepancy, as typically there is a crude packet counting mechanism that is arbitrarily equated to delay. In those flawed systems, the wait time is directly related to number of packets in queue, and the service time is directly related to size of the packet relative to link speed. Communication system 10 can offer a mechanism with a better correlation to the processing time and the delay. There is an additional dimension of the relation of content of packet. Providing a feedback function that uses content and inputs to affect quantity, type, and filters used as input in order to regulate system delay offers a superior method to identifying and controlling delay in service elements.

The present architecture can readily identify that the number of packets that require intensive processing and the number of packets that require nominal processing. Part of this analysis could include evaluating the header information in individual packets in order to better predict which packets will require intensive processing. Note that other examples may include that the initial packets and the last packets in the flow would receive intensive processing, whereas the packets in the middle would require nominal processing.

Furthermore, a quick inventory of queue 34 would allow the system to quickly evaluate an accurate gauge of delay for this particular flow. Thus, the delay can be estimated for packets residing in queue 34, and then the system can inferentially determine a maximum delay to be configured for the service element.

In this example, once the number of packets within queue 34 has been determined (along with processing estimations for these packets), after the input queue reaches a certain threshold, the firewall can take action to drop certain packets. It should be noted that the systematic evaluation of queue 34 and the analysis of the delay is relatively constant for service elements; however, the response mechanism could be different and be based on the exact element employing the features of the present invention. In essence, the system is leveraging information to better predict the delay within the service elements, as they process incoming packets and service flows. Part of this optimal delay management is due to the flow table, which provides a significant advantage over stateless systems that haphazardly account for delay.

Thus, in this sense, the system is offering an effective early detection and control of delay for service elements in the network. This allows the service element to react in advance so the overall delay inside the service element will not fall behind a certain level. In the mechanism outlined herein, when the number of bytes in the queue reaches a certain level, the processing units can change their processing mode.

Figure 2:
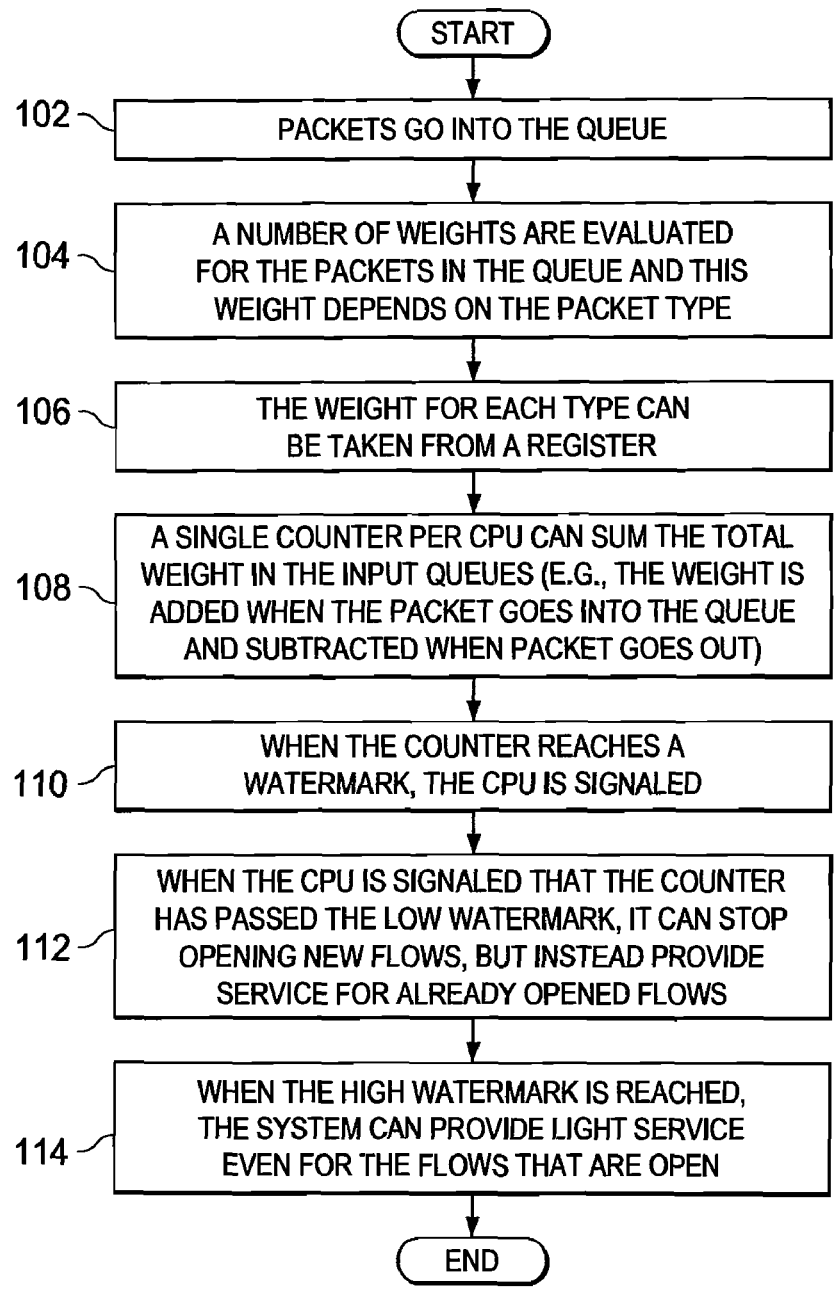
FIG. 2 is a simplified flowchart illustrating a series of example steps associated with the communication system.

Turning now to the example flow of FIG. 2, FIG. 2 is a simplified flowchart that includes a series of example steps associated with an operation of communication system 10. The illustration of FIG. 2 has been provided for purposes of teaching only and, therefore, should be construed as such.

This flow of FIG. 1 relates to DPI processing. At step 102, packets go into the queue. The number of packets in the queue that are waiting for processing gives a close approximation for the latency in the queue. In this example, there are three groups: 1) packets that take about 4 us of processing; 2) packets that take about 6 us of processing; and 3) packets that take about 1 us of processing.

Thus, at step 104, a number of weights are evaluated for the packets in the queue and this weight depends on the packet type. The weight for each type can be taken from register (e.g., configurable by software) at step 106.

At step 108, a single counter per CPU core can sum the total weight in the input queues (e.g., the weight is added when the packet goes into the queue and subtracted when packet goes out). In this example, there are two configured watermarks per controller. When the counter reaches a watermark, the CPU is signaled at step 110.

At step 112, another congestion mode in the operating system is added when the high watermark is reached. Thus, when the queue reaches the low watermark, the CPU is signaled that the counter has passed the low watermark and the CPU can stop opening new flows, but instead provide service for already opened flows. Additionally, when the high watermark is reached, the system can provide light service even for the flows that are open. This is illustrated at step 114.

Note that in certain embodiments, there is no separate counter per packet-type in the processor engine. In some embodiments, the processor engine will not expose the actual mix of packets in the input queue and, instead, simply sums of weight in this particular example.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in FIG. 2 illustrate only some of the possible scenarios that may be executed by, or within, communication system 10. Some of these steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present invention.

Although the present invention has been described in detail with reference to particular arrangements and configurations, these example configurations and arrangements may be changed significantly without departing from the scope of the present invention. For example, although the present invention has been described with reference to particular communication exchanges involving certain types of applications or routing protocols (e.g., DPI, service-based applications, etc.), communication system 10 may be applicable to other applications, routing protocols, or routed protocols in which packets are processing and then sent to the network.

Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus, comprising:
a service element that includes one or more queues that are coupled to one or more processor engines and to one or more processing units, wherein an accumulated delay for a selected one of the queues is determined by identifying a number of packets within the selected queue that involve intensive processing and a number of packets within the selected queue that involve nominal processing, and wherein the service element evaluates header information in individual packets in order to identify delay characteristics, and wherein the accumulated delay is compared to a threshold value to determine whether to adjust a processing mode of the one or more processor engines, and wherein if the threshold value is exceeded, new flows associated with a specific type of service are not processed based on identifying that the new flows have less priority that other flows propagating through the service element, and wherein a processing unit is configured to calculate an average processing time for groupings of the packets and to update weights associated with the groupings in order to adjust the accumulated delay.

2. The apparatus of claim 1, wherein the one or more processor engines have an associated flow table such that for a flow traversing the service element, specific packets of the flow are identified for receiving a certain amount of processing from the one or more processor engines.

3. The apparatus of claim 1, wherein the adjustment includes avoiding opening new flows for the service element, or providing continued service to a selected few flows and not others.

4. The apparatus of claim 1, wherein one or more packets traversing the service element are divided into multiple groups.

5. The apparatus of claim 4, wherein each of the groups can be characterized by an average processing time for packets within the groups.

6. The apparatus of claim 4, wherein each of the groups is assigned a weight that represents an average processing time of the group in relation to a processing time of other groups.

7. The apparatus of claim 6, wherein when a selected first packet enters a specific queue, its weight is added to an accumulated delay of the specific queue and when a selected second packet exits the specific queue its weight is subtracted.

8. The apparatus of claim 1, wherein one of the one or more processor engines is a field programmable gate array (FPGA).

9. The apparatus of claim 1, wherein the packets are delivered to the one or more processor engines sequentially.

10. The apparatus of claim 1, wherein each of the one or more queues are first in first out buffers.

11. The apparatus of claim 1, wherein each of the one or more queues are between the one or more processor engines and the one or more processing units.

12. A method, comprising:
identifying a delay for a selected one of a plurality of queues in a service element by evaluating an accumulated delay for packets within the selected queue waiting for processing, wherein the accumulated delay is determined by identifying a number of packets within the selected queue that involve intensive processing and a number of packets within the selected queue that involve nominal processing, and wherein the service element evaluates header information in individual packets in order to identify delay characteristics, wherein the plurality of queues are coupled to one or more processor engines and to one or more processing units; and
comparing the accumulated delay to a threshold value to determine whether to adjust a processing mode of the one or more processor engines, and wherein if the threshold value is exceeded, new flows associated with a specific type of service are not processed based on identifying that the new flows have less priority than other flows propagating through the service element, and wherein an average processing time is calculated for groupings of the packets and weights associated with the groupings can be updated in order to adjust the accumulated delay.

13. The method of claim 12, further comprising:
providing a flow table that maps specific packets of a flow traversing the service element for receiving a certain amount of processing from the one or more processor engines.

14. The method of claim 12, wherein the adjustment includes avoiding opening new flows for the service element, or providing continued service to a selected few flows and not others.

15. The method of claim 12, wherein one or more packets traversing the service element are divided into multiple groups, and wherein each of the groups can be characterized by an average processing time for packets within the groups.

16. The method of claim 15, wherein each of the groups is assigned a weight that represents an average processing time of the group in relation to a processing time of other groups, and wherein when a selected first packet enters the selected queue, its weight is added to an accumulated delay of the selected queue and when a selected second packet exits the selected queue its weight is subtracted.

17. Logic encoded in a non-transitory media for execution and when executed by a processor operable to:
identify a delay for a selected one of a plurality of queues in a service element by evaluating an accumulated delay for packets within the selected queue waiting for processing, wherein the accumulated delay is determined by identifying a number of packets within the selected queue that involve intensive processing and a number of packets within the selected queue that involve nominal processing, and wherein the service element evaluates header information in individual packets in order to identify delay characteristics, wherein the plurality of queues are coupled to one or more processor engines and to one or more processing units; and
compare the accumulated delay to a threshold value to determine whether to adjust a processing mode of the one or more processor engines, and wherein if the threshold value is exceeded, new flows associated with a specific type of service are not processed based on identifying that the new flows have less priority than other flows propagating through the service element, and wherein an average processing time is calculated for groupings of the packets and weights associated with the groupings can be updated in order to adjust the accumulated delay.

18. The logic of claim 17, wherein the code is further operable to:

provide a flow table that maps specific packets of a flow traversing the service element for receiving a certain amount of processing from the one or more processor engines.

19. The logic of claim 17, wherein the adjustment includes avoiding opening new flows for the service element, or providing continued service to a selected few flows and not others.

20. The logic of claim 19, wherein one or more packets traversing the service element are divided into multiple groups, and wherein each of the groups can be characterized by an average processing time for packets within the groups.

* * * * *